US009959762B1

(12) United States Patent
Kim et al.

(10) Patent No.: US 9,959,762 B1
(45) Date of Patent: May 1, 2018

(54) APPARATUS AND METHOD FOR GENERATING WARNING IN VEHICLE

(71) Applicants: HYUNDAI MOTOR COMPANY, Seoul (KR); KIA MOTORS CORPORATION, Seoul (KR)

(72) Inventors: Eungseo Kim, Suwon-si (KR); Junghyun Kim, Seoul (KR); Sangmin Lee, Seoul (KR); Taeyoung Lee, Yongin-si (KR); Donghyun Sung, Hwaseong-si (KR); Yongseok Kwon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days. days.

(21) Appl. No.: 15/680,818

(22) Filed: Aug. 18, 2017

(30) Foreign Application Priority Data

Feb. 24, 2017 (KR) ........................ 10-2017-0024665

(51) Int. Cl.
*G08G 1/16* (2006.01)
*B60R 21/0134* (2006.01)
*B60R 21/013* (2006.01)

(52) U.S. Cl.
CPC ............. *G08G 1/16* (2013.01); *B60R 21/013* (2013.01); *B60R 21/0134* (2013.01); *G08G 1/164* (2013.01)

(58) Field of Classification Search
CPC .......... G08G 1/16; G08G 1/161; G08G 1/164; G08G 1/165; G08G 1/167; G01S 13/931; G01S 13/9325; B60R 21/013; B60R 21/0134; B60W 2750/30
See application file for complete search history.

(56) References Cited

U.S. PATENT DOCUMENTS

| 5,357,438 | A | * | 10/1994 | Davidian | ............... B60K 37/06 180/169 |
| 7,425,043 | B2 | | 9/2008 | Doerr et al. | |
| 9,824,585 | B2 | * | 11/2017 | Takeuchi | ............... G08G 1/165 |
| 2016/0280134 | A1 | * | 9/2016 | Miura | ................... B60Q 9/008 |
| 2017/0240186 | A1 | * | 8/2017 | Hatano | ................. B60W 50/14 |

FOREIGN PATENT DOCUMENTS

| JP | 07-146370 A | 6/1995 |
| JP | 11-031299 A | 2/1999 |
| KR | 1997-0026447 B1 | 6/1997 |
| KR | 10-1478068 B1 | 1/2015 |

* cited by examiner

*Primary Examiner* — Van Trieu
(74) *Attorney, Agent, or Firm* — McDermott Will & Emery LLP

(57) ABSTRACT

An apparatus and a method for warning in a vehicle generates a warning based on a distance in order to avoid a problem that may occur when a collision warning is generated based on only a time required for a collision. The method of generating a warning in a vehicle includes: obtaining a distance and a relative speed of the vehicle to a target vehicle ahead; obtaining a time required for a collision with the target vehicle from the distance and the relative speed; and generating a warning when at least one of a first condition in which the time required for the collision is equal to or less than a predetermined warning generation time and a second condition in which the distance is equal to or less than a predetermined warning generation distance is satisfied.

14 Claims, 8 Drawing Sheets

APPARATUS AND METHOD FOR GENERATING WARNING IN VEHICLE

CROSS-REFERENCE TO RELATED APPLICATION

The present application is based on and claims the benefit of priority to Korean Patent Application No. 10-2017-0024665, filed on Feb. 24, 2017 with the Korean Intellectual Property Office, the entire disclosure of which is incorporated herein by reference.

TECHNICAL FIELD

Embodiments of the present disclosure relate to generating a warning for safe driving of a vehicle.

BACKGROUND

An autonomous emergency braking (AEB) system is very effective in avoiding or mitigating crashes including a collision with a pedestrian. The AEB system is a safety device officially included as an item for the safety assessment by European New Car Assessment Program (Euro NCAP) from 2014. The AEB system operates when a preceding vehicle slows down or stops, or when obstacles such as pedestrians suddenly appear. The AEB system avoids collisions or minimizes the damage by generating a warning to a driver or activating the brake on its own without a driver's instruction. There is a statistical result that about 90% of traffic accidents on the road are caused by the driver's concentration loss or carelessness. Experiments have shown that the AEB system can reduce collisions by up to 27% and significantly reduce degrees of injuries even in unavoidable accidents.

Currently Euro NCAP divides the AEB system into three categories. One of the three categories is an AEB system for downtown area, which is used to monitor a distance of less than 10 m from a preceding vehicle in a slow driving mode with the speed of about 20 kilometers per hour (km/h) or less. Another category is an AEB system for suburban area, which mainly monitors the distance of about 200 m in a driving mode with the speed of about 50-80 km/h and significantly reduces risk of accidents even in the slow driving mode in the downtown area. The last category is a pedestrian AEB system, which stops the vehicle when a weak obstacle such as a pedestrian is detected.

If an obstacle is detected, the AEB System prepares to stop the vehicle by, e.g., increasing pressure of a brake system in advance to reduce a gap between a brake pad and a brake disc so that maximum braking performance can be achieved even if the driver steps on a brake pedal late in time. The AEB system has a warning function to draw the driver's attention with a warning sound or an alert first, if there is no action taken from the driver despite the prediction of an accident in advance.

SUMMARY

An object of embodiments of the present disclosure is to generate an alert according to a distance-based condition to address the problem that may arise when a collision warning is generated only based on expected time taken for a collision.

In accordance with an aspect of the present disclosure, a method of generating a warning in a vehicle may include: obtaining a distance and a relative speed of the vehicle to a target vehicle ahead; obtaining a time required for a collision with the target vehicle from the distance and the relative speed; and generating a warning if at least one of a first condition in which the time required for the collision is equal to or less than a predetermined warning generation time and a second condition in which the distance is equal to or less than a predetermined warning generation distance is satisfied.

Generating the warning according to the second condition may include generating the warning every time the target vehicle is within a predetermined ratio of a previous warning generation distance.

The warning may be generated for a predetermined time every time the target vehicle is within the predetermined ratio of the previous warning generation distance.

The predetermined time may be within two seconds.

The predetermined ratio may be within 60%.

In accordance with another aspect of the present disclosure, an apparatus for generating a warning in a vehicle may include: a sensor for detecting a presence of a target vehicle ahead; and a controller for obtaining a distance and a relative speed of the vehicle to the target vehicle, obtaining a time required for a collision with the target vehicle from the distance and the relative speed, generating a warning if at least one of a first condition in which the time required for the collision is equal to or less than a predetermined warning generation time and a second condition in which the distance is equal to or less than a predetermined warning generation distance is satisfied.

The controller may generate the warning every time the target vehicle is within a predetermined ratio of a previous warning generation distance, in generating the warning according to the second condition.

The controller may generate the warning for a predetermined time every time the target vehicle is within the predetermined ratio of the previous warning generation distance.

The predetermined time may be within two seconds.

The predetermined ratio may be within 60%.

In accordance with another aspect of the present disclosure, a method of generating a warning in a vehicle may include: obtaining a distance to a target vehicle ahead; and generating a warning when the distance is equal to or less than a predetermined warning generation distance, in which the warning is generated every time the target vehicle is within a predetermined ratio of a previous warning generation distance.

The warning may be generated for a predetermined time every time the target vehicle comes within the predetermined ratio of the previous warning generation distance.

In accordance with another aspect of the present disclosure, a method of generating a warning in a vehicle may include: obtaining a distance and a relative speed of the vehicle to a target vehicle ahead; obtaining a time required for a collision with the target vehicle from the distance and the relative speed; and generating a warning if at least one of a first condition in which the time required for the collision is equal to or less than a predetermined warning generation time and a second condition in which the distance is equal to or less than a predetermined warning generation distance is satisfied, wherein the warning is generated every time the target vehicle enters within a predetermined ratio of a previous warning generation distance.

The warning may be generated for a predetermined time every time the target vehicle is within the predetermined ratio of the previous warning generation distance.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
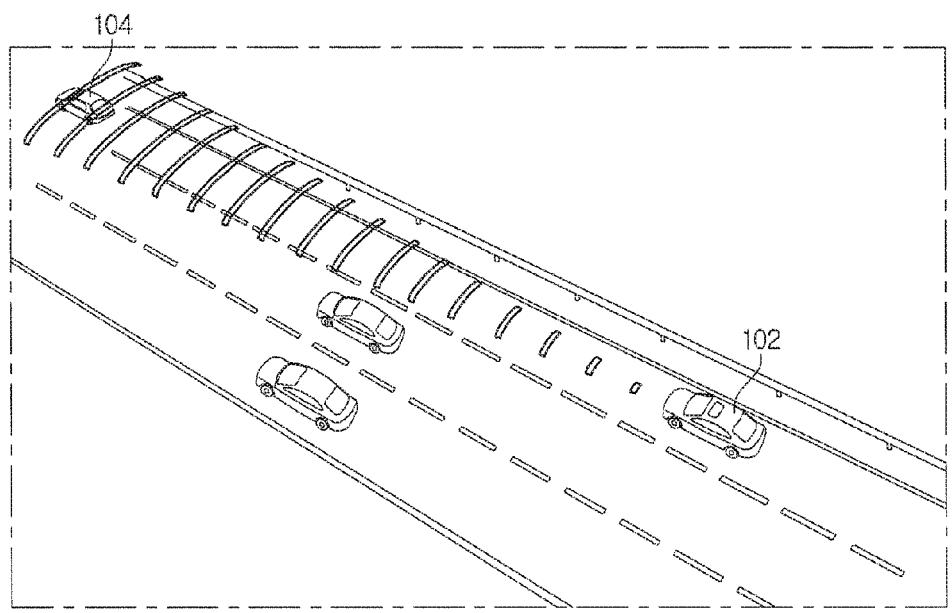
FIG. 1 is a diagram illustrating front obstacle detection using an Autonomous Emergency Braking (AEB) system of a subject vehicle, according to an embodiment of the present disclosure.

In the description of the present disclosure, drawings and embodiments shown in the drawings are preferred examples of the disclosed invention, and there can be various modifications that can replace the embodiments and the drawings of the present disclosure at the time of filing of the present disclosure.

Among the terms mentioned in the description of the embodiment of the present disclosure, the terms 'subject vehicle', 'target vehicle', 'pedestrian' and 'obstacle' can be defined as follows. The 'subject vehicle' may be a vehicle to which an apparatus and method according to embodiments of the present disclosure is applied. The 'target vehicle' may be other vehicle located around the 'subject vehicle'. For example, the target vehicle refers to a vehicle located in front of the subject vehicle, whose distance is measured through the radar and/or camera of the subject vehicle while the subject vehicle is being driven. The 'pedestrian' may be a person located near the subject vehicle. The 'pedestrian' may include both a walking person and a person standing still. The 'obstacle' may refer to the 'target vehicle' and the 'pedestrian' as well as 'structure' around the subject vehicle.

FIG. 1 is a diagram illustrating front obstacle detection using an Autonomous Emergency Braking (AEB) system of a subject vehicle according to an embodiment of the present disclosure.

As shown in FIG. 1, the AEB system of a subject vehicle 102 uses a sensor such as a radar, etc., to determine whether an obstacle (for example, a target vehicle 104) is present ahead. If the target vehicle 104 is detected in front of the subject vehicle 102, a warning is generated to draw a driver's attention, a distance between the subject vehicle 102 and the obstacle is automatically adjusted by deceleration to secure the safety distance. If required, the vehicle 102 may slow down or may be stopped more aggressively by braking.

When the subject vehicle 102 travels along a lane on a road, the presence of the target vehicle 104 running in front of the vehicle 102 is detected by a distance measuring device such as the radar mounted on the subject vehicle 102. If the target vehicle 104 exists, a cruise control system acquires distance information from the subject vehicle 102 to the target vehicle 104. In addition, the cruise control system also determines whether the distance between the subject vehicle 102 and the target vehicle 104 increases or decreases. Using the radar, the presence of the target vehicle 104, the distance to the target vehicle 104, and even whether the distance between the target vehicle 104 and the subject vehicle 102 increases or decreases may be detected by receiving a radio wave or a sound wave reflected from the target vehicle 104 after radiating the radio wave or the sound wave toward the front of the subject vehicle 102.

Figure 2:
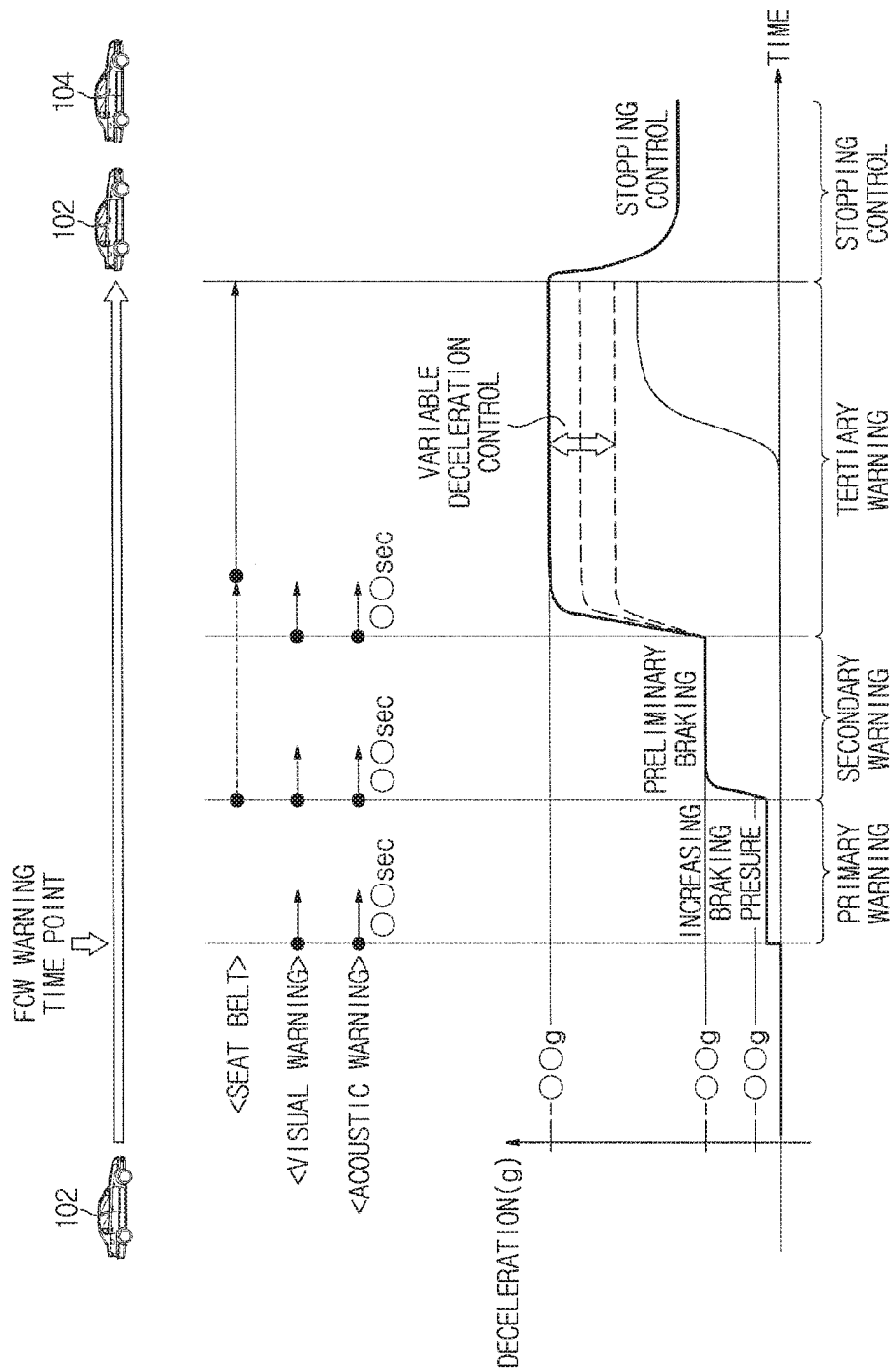
FIG. 2 is a diagram illustrating operation control using an AEB system of a vehicle, according to an embodiment of the present disclosure.

FIG. 2 is a diagram illustrating operation control using an AEB system of a vehicle according to an embodiment of the present disclosure. As shown in FIG. 2, if a presence of the target vehicle 104 is detected in the forward direction while the subject vehicle 102 is running, a stepwise emergency braking such as a primary warning, a secondary warning, a tertiary warning, and a stopping control is performed depending on a driving condition between the subject vehicle 102 and the target vehicle 104.

If the subject vehicle 102 reaches a predetermined running condition with respect to the target vehicle 104, the primary warning is generated. The primary warning may be a forward collision warning (FCW). If the FCW is generated, a visual warning and an acoustic warning are generated first to warn the driver (and held for a predetermined ∞ second(s) (e.g., two seconds). The braking pressure of the subject vehicle 102 increases when the primary warning generated. The braking pressure is the pressure of the hydraulic cylinder for activating the brake. Preliminarily increasing the braking pressure is for preparing the subject vehicle 102 to quickly apply the brake in a case that the subject vehicle 102 approaches the preceding target vehicle 104 a bit closer.

When the subject vehicle 102 reaches another predetermined driving condition related to the target vehicle 104, the secondary warning is generated in the subject vehicle 102. The secondary warning may be a haptic warning through a seat belt. The haptic warning intermittently repeats fastening and unfastening of the seat belt so that the driver may feel the fastening and unfastening of the seat belt. In case of the secondary warning, visual warning and acoustic warning are generated to warn the driver (and held for a predetermined ∞ second(s) (e.g., two seconds). In addition, preliminary braking is performed by elaborately operating the brake during the secondary warning. Since the braking pressure has already increased during the primary warning, the preliminary braking of the secondary warning may be performed promptly.

When the subject vehicle 102 reaches another predetermined driving condition related to the target vehicle 104, the tertiary warning is generated in the subject vehicle 102. The tertiary warning may be to tighten the seatbelt to the maximum and fix the driver's body. In case of the tertiary warning, visual warning and acoustic warning are generated to warn the driver (and held for a predetermined ∞ second (s) (e.g., two seconds). In addition, during the occurrence of the tertiary warning, variable deceleration control is performed in consideration of the current speed of the subject vehicle 102 and the relative distance to the target vehicle 104. That is, the faster the speed of the subject vehicle 102 or the closer the relative distance to the target vehicle 104, the faster and more powerful the braking may be performed. Since the braking pressure has already increased in the primary warning, braking in the tertiary warning may be performed promptly and sufficiently. If the speed of the subject vehicle 102 is relatively slow or if the relative distance to the target vehicle 104 is relatively sufficient, the subject vehicle 102 performs the braking relatively slowly and smoothly.

If the subject vehicle 102 reaches a relatively extreme driving condition with respect to the target vehicle 104, the braking force is maximized to stop the subject vehicle 102 urgently.

As mentioned in description of FIG. 2, each of the primary warning, the secondary warning, and the tertiary warning is generated in accordance with the <driving condition> between the subject vehicle 102 and the target vehicle 104. In the embodiment of the present disclosure, as a condition for generating each of the primary warning the secondary warning, and the tertiary warning, the <driving condition> may further be specified as follows to generate each warning. For example, in the embodiment of the present disclosure, the <driving condition> is classified into two conditions of <FCW time> and <FCW distance>, and a warning is generated if any one of the two conditions is satisfied.

Figure 3:
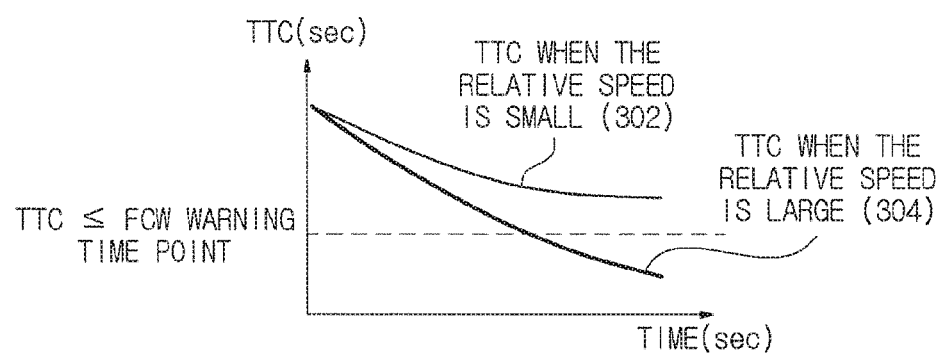
FIG. 3 is a graph representing conditions of <FCW time>, according to an embodiment of the present disclosure.

FIG. 3 is a graph representing conditions of <FCW time> according to the embodiment of the present disclosure. In FIG. 3, TTC (Time to Collision) is an expected time taken for the subject vehicle 102 to collide with the target vehicle 104. As expressed in equation (1) below, the TTC is equal to the distance to the obstacle divided by the speed.

$$TTC = distance/relative\ speed \quad (1)$$

According to the equation 1, as the TTC becomes zero, the subject vehicle 102 and the target vehicle 104 collide. The closer the distance between the subject vehicle 102 and the target vehicle 104 is or the greater the relative speed between the subject vehicle 102 and the target vehicle 104, the closer the TTC converges to zero. Therefore, for safety, it is required to generate a warning in advance before the TTC reaches 0, preferably when the TTC reaches a predetermined value greater than zero (FCW warning time point).

However, if the target vehicle 104 is also traveling at high speed while the subject vehicle 102 is traveling at high speed, the relative speed decreases. Therefore, even if the subject vehicle 102 travels close the target vehicle 104, the warning may not be generated because the TTC does not decrease sufficiently. In particular, if the speed of the preceding target vehicle 104 suddenly decreases while the vehicle 102 is traveling at high speed and approaching close to the target vehicle 104, the driver of the subject vehicle 102 may not be able to respond to the collision between the subject vehicle 102 and the target vehicle 104, so that the risk of collision further increases (it is more dangerous because the driver of the vehicle 102 might not have enough time to respond to the situation). On the contrary, if the relative speed between the subject vehicle 102 and the target vehicle 104 is sufficiently high, a warning may be generated before a collision because the TTC reaches the predetermined FCW warning time point, as illustrated in 304 of FIG. 3

Figure 4:
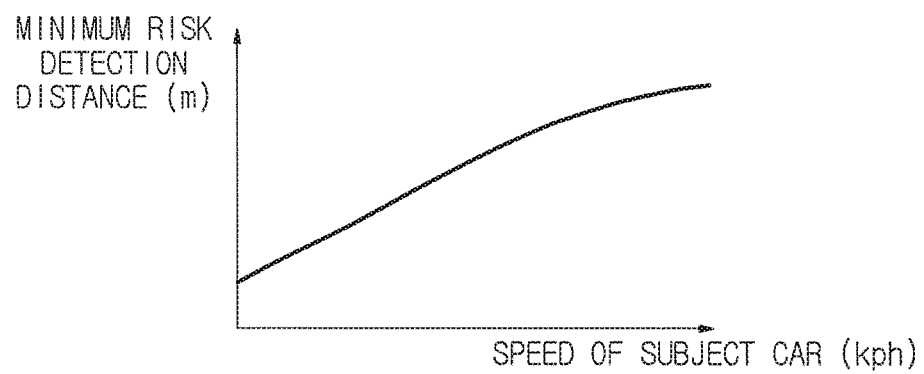
FIG. 4 is a diagram illustrating a minimum risk detection distance, according to an embodiment of the present disclosure.

FIG. 4 is a diagram illustrating a minimum risk detection distance according to an embodiment of the present disclosure. As the speed of the subject vehicle 102 increases while the target vehicle 104 is running in front of the subject vehicle 102, a degree of risk felt by the driver of the subject vehicle 102 also increases. If the shortest distance that the driver feels dangerous is called the minimum risk detection distance, as the speed of the subject vehicle 102 increases, the minimum risk detection distance also increases, as shown in FIG. 4.

Figure 5:
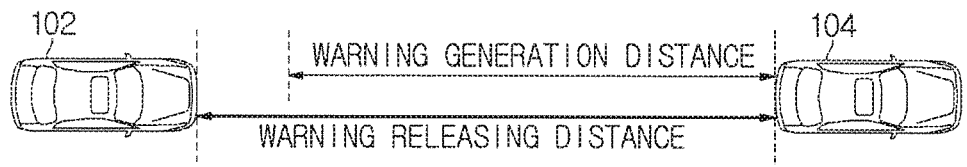
FIG. 5 is a diagram illustrating generation of a warning using a minimum risk detection distance (FCW distance), according to an embodiment of the present disclosure.

FIG. 5 is a diagram illustrating generation of a warning using a minimum risk detection distance (FCW distance) according to an embodiment of the present disclosure. The generation of warning using the minimum risk detection distance shown in FIG. 5 is a method of generating a warning not based on the TTC, i.e., time, but based the degree of risk felt by the driver from the 'distance' to the preceding target vehicle 104.

As shown in FIG. 5, a warning is generated when the distance between the subject vehicle 102 and the target vehicle 104 is within the warning generation distance, and the warning is released when the distance between the subject vehicle 102 and the target vehicle 104 exceeds the warning releasing distance. The warning is generated for a predetermined time and then stopped (for example, the warning is held for a predetermined ○○ second(s) (e.g., two seconds).

In FIG. 5, the warning generation distance is determined according to a speed of the subject vehicle 102. For example, the higher the speed of the subject vehicle 102 is, the shorter the warning generation distance becomes. In contrast, the lower the speed of the subject vehicle 102 is, the longer the warning generation distance becomes. The speed that determines the warning generation distance is not a relative speed with respect to the target vehicle 104 but an absolute speed of the subject vehicle 102. Since the warning generation distance is determined according to the speed of the subject vehicle 102, a warning is generated when the speed of the subject vehicle 102 is high (even when the relative speed between the subject vehicle 102 and the target vehicle 104 is very low), as described in FIG. 3. This may solve the problem in which a warning is not generated due to the low relative speed.

In FIG. 5, it is preferable that the warning release distance is determined by adding a slight margin to the warning generation distance determined for each speed. Such a slight margin may prevent frequent generation of warning in the vicinity of the warning generation distance.

Figure 6:
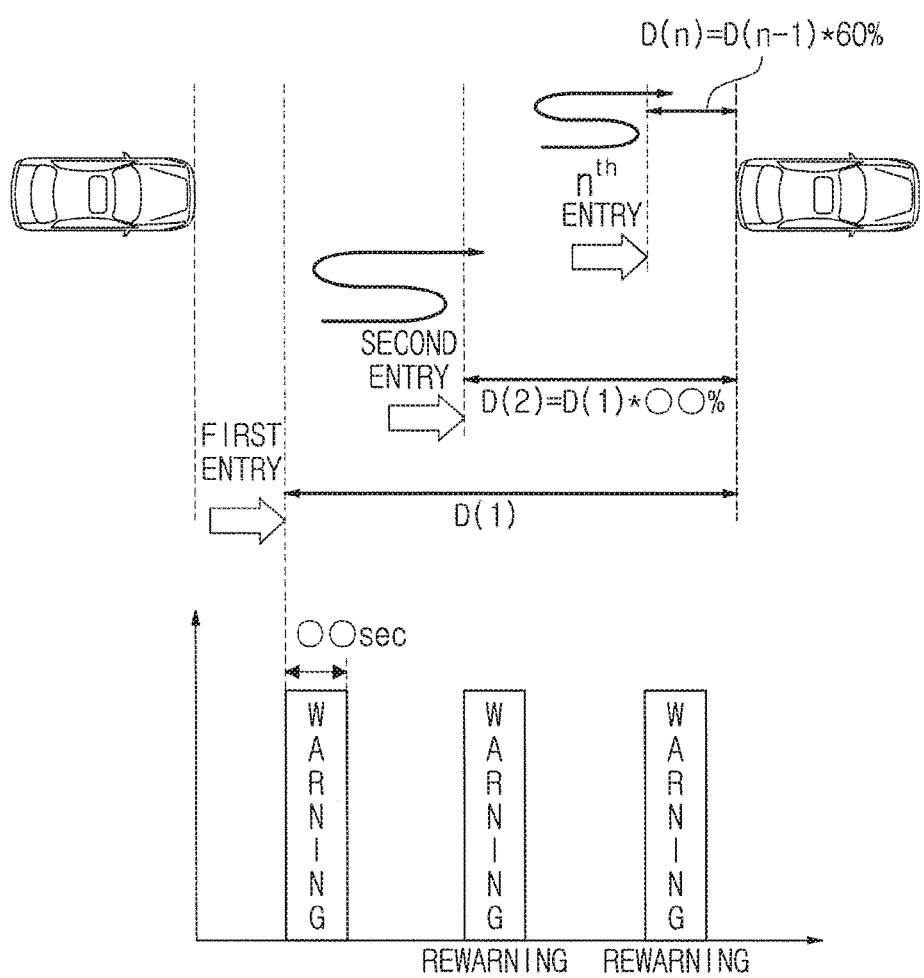
FIG. 6 is a diagram illustrating a warning generation distance (FCW distance), according to another embodiment of the present disclosure.

FIG. 6 is a diagram illustrating a warning generation distance (FCW distance) according to another embodiment of the present disclosure. As the vehicle 102 travels, it is more common that the distance between the subject vehicle 102 and the preceding target vehicle 104 often increases and decreases rather than remains constant. FIG. 6 shows a method of differently operating the warning generation distance in a case that the subject vehicle 102 gradually approaches the target vehicle 104 while repeatedly approaching and departing from the target vehicle 104.

As shown in FIG. 6, in the case that the subject vehicle 102 gradually approaches the target vehicle 104 while repeatedly approaching and departing from target vehicle 104, a new warning generation distance is applied, which results from the previous warning generation distance reduced by a predetermined ratio. The predetermined ratio may be 60%.

For example, when a currently set warning generation distance is D(1), if the subject vehicle 102 approaches the target vehicle 104 and comes within the warning generation distance D(1) (first entry), a warning is generated (for a predetermined ○○ second(s) (e.g., two seconds)). After that, if the vehicle 102 approaches the target vehicle 104 and comes within the distance D(2) corresponding to a predetermined ∘∘% (e.g., 60%) of D(1) (second entry), a warning is generated again (for a predetermined ∘∘ second(s) (e.g., two seconds)). Subsequently, if the subject vehicle 102 approaches the target vehicle 104 and comes within the warning generation distance D(3) corresponding to a predetermined ∘∘% (e.g., 60%) of D(2) (third entry), a warning is generated once again (for a predetermined ∘∘ second(s) (e.g., two seconds)).

When the TTC condition is operated alone, the same problem as described in the description of FIG. 3 may occur. Therefore, in the embodiment of the present disclosure, a warning is generated even if one of two conditions of <FCW time> condition shown in FIG. 3 and <FCW distance> condition shown in FIG. 4 to FIG. 6, thereby increasing probability of generating a warning.

Figure 7:
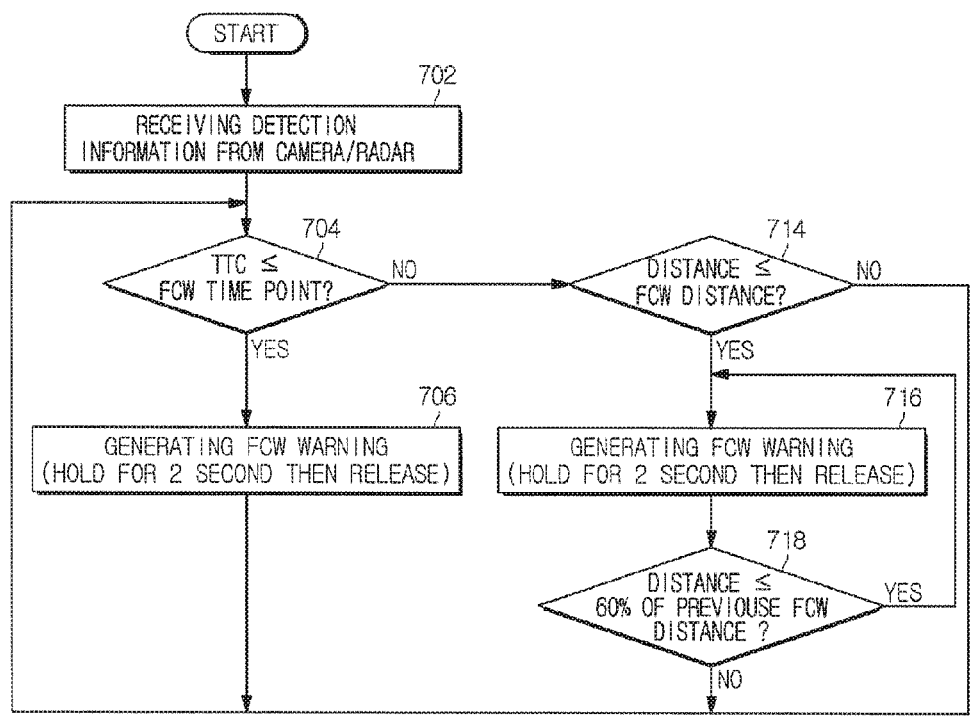
FIG. 7 is a diagram illustrating a method of generating a warning in a vehicle, according to an embodiment of the present disclosure.

FIG. 7 is a diagram illustrating a method for generating a warning in a vehicle according to an embodiment of the present disclosure. A controller (or ECU) (see 804 of FIG. 8) that controls overall operation of the AEB system receives detection information from the camera/radar in 702. The detection information from the camera/radar is a result of detecting an obstacle (e.g., target vehicle, a pedestrian, a structure, etc.) existing in front of the subject vehicle 102. The controller 804 calculates a distance and relative speed to the target vehicle 104 based on the detection information received from the camera/radar.

If an obstacle (for example, target vehicle 104) exists in front of the subject vehicle 102, the controller 804 calculates the TTC from the distance and relative speed to the target vehicle 104, and determines whether the TTC is less than or equal to the predetermined FCW time, in 704.

If the calculated TTC is less than or equal to the predetermined FCW time ('Yes' in 704), the controller 804 enters to a first warning generation step of the AEB (for example, FCW warning generation step) to generate an FCW warning, in 706. The FCW warning is released after a predetermined time (for a predetermined ∘∘ second(s) (e.g., two seconds)) has elapsed. After the generation of the FCW warning, the process returns to step 704 to prepare for future warning generation.

If the calculated TTC is greater than the preset FCW time point ('No' in 704), the controller 804 determines whether the distance between the subject vehicle 102 and the target vehicle 104 is less than or equal to a predetermined FCW distance, in 714). If the distance between the subject vehicle 102 and the target vehicle 104 is less than or equal to a predetermined FCW distance ('Yes' in 714), the controller 804 enters to the first warning generation step of the AEB (for example, the FCW warning generation step) to generate the FCW warning (716). The FCW warning is released after a predetermined time (for a predetermined ∘∘ second(s) (e.g., two seconds)) has elapsed.

After the generation of the FCW warning, the distance between the subject vehicle 102 and the target vehicle 104 is measured again to determine if the newly measured distance between the subject vehicle 102 and the target vehicle 104 is within a predetermined ratio (e.g., 60%) of the previous measured distance, in 718.

If the newly measured distance between the subject vehicle 102 and the target vehicle 104 is within a predetermined ratio (e.g., 60%) of the previously measured distance ('Yes' in 718), the controller 804 enters to the first warning generation step of the AEB (for example, the FCW warning generation step) to generate the FCW warning, in 716. The FCW warning is released after a predetermined time (for a predetermined ∘∘ second(s) (e.g., two seconds)) has elapsed.

If the newly measured distance between the subject vehicle 102 and the target vehicle 104 is not within a predetermined ratio (e.g., 60%) of the previously measured distance after the generation of the FCW warning, the process returns to step 704 to prepare for future warning generation.

As described above, in the embodiment of the present disclosure, the closer the subject vehicle 102 approaches the target vehicle 104, the more warnings are generated in a short period of time, for example, first to third warnings are generated for a predetermined ∘∘ second(s) (e.g., two seconds). Such a method of generating multiple warnings is much more effective in calling the driver's attention than a method in which a single short warning is generated once. In addition, with multiple off-and-on warnings, the effect of calling the driver's attention may be doubled while preventing unpleasant feeling that might be otherwise felt by the driver due to a long warning, which is not off-and-on.

When operating the TTC condition alone, the problem may arise that a warning is not generated even though a warning should be generated as mentioned in the description of FIG. 3. In order to solve this problem, in the embodiment of the present disclosure, a warning is generated even if either of the two conditions of <FCW time> shown in FIG. 3 and <FCW distance> shown in FIG. 4 is met.

Figure 8:
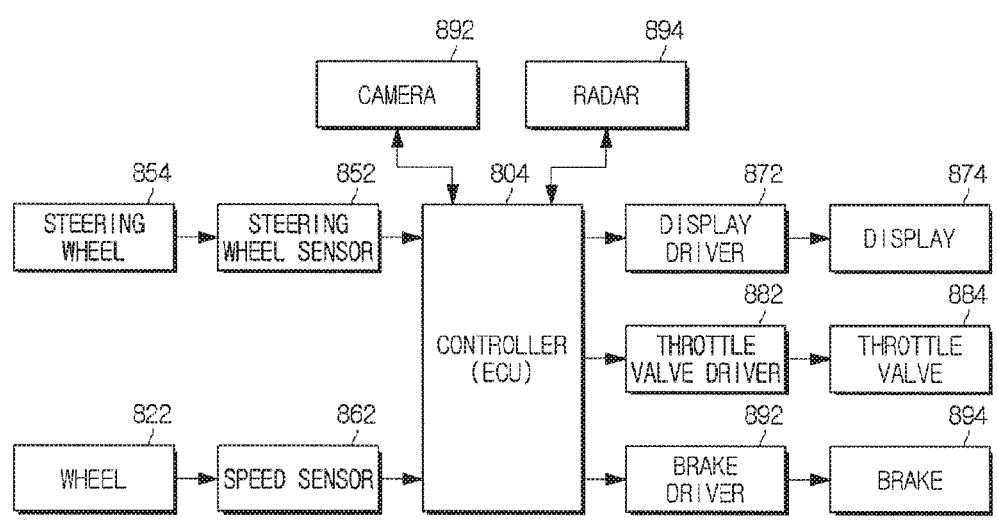
FIG. 8 is a diagram illustrating a control system of an apparatus for generating a warning in a vehicle, according to an embodiment of the present disclosure.

FIG. 8 is a diagram illustrating a control system of a driving assistance apparatus for a vehicle according to an embodiment of the present disclosure. In an embodiment, a warning may be generated through the control system of the driving assistance apparatus shown in FIG. 8. As shown in FIG. 8, the control system of the driving assistance apparatus may include a controller 804, a front radar 894, and a front camera 892. The front radar 894 and the front camera 892 are communicably connected to the controller 804 to transmit information relating to an obstacle (e.g., radar detection information and video signal, etc.) detected in front of the subject vehicle 102 to the controller 804.

The controller 804 receives information about the extent of manipulation (for example, about a steering angle, etc.) of a steering wheel 854 from a steering wheel sensor 852 and also receives speed information of the subject vehicle 102 from a speed sensor 862. The information about the extent of manipulation of the steering wheel 854 received from the steering wheel sensor 852 may be used to obtain the running direction information of the subject vehicle 102. The speed information of the subject vehicle 102 may be speed information based on the rotational speed of a wheel 822 collected through an encoder provided on the wheel 822. The speed information of the subject vehicle 102 may be collected not only from the encoder of the wheel 822 but also based on an air flow rate around the subject vehicle 102. The speed information of the subject vehicle 102 may be used for constant speed driving control of the subject vehicle 102, control of the relative speed to the target vehicle, and distance maintenance control.

The controller 804 also generates a plurality of control signals for controlling the subject vehicle 102 in a driving assistance control mode. The plurality of control signals generated by the controller 804 may include a display control signal, a throttle valve control signal, and a brake control signal.

The display control signal causes a display driver 872 to display information on a display 874. The throttle valve control signal drives a throttle valve driver 882 to adjust an opening degree of a throttle valve 884. The throttle valve 884 is configured to adjust the amount of air supplied to an engine of the subject vehicle 102, and basically, the opening degree of the throttle valve 884 may be adjusted in response to a user's manipulation on an accelerator pedal. However, in the driving assistance control mode, even without the user's manipulation on the accelerator pedal, the controller 804 may take initiative and adjust the opening degree of the throttle valve 884, and directly engage in directly controlling the opening of the throttle valve 884. The controller 804 controls the opening degree of the throttle valve 884 to increase/maintain/reduce the speed of the subject vehicle 102 in accordance with the surrounding environment of the subject vehicle 102, apart from the extent of manipulation on the accelerator pedal.

The brake control signal drives a brake driver 892 to operate a brake 894. In the driving assistance control mode, until active intervention of a user occurs, the controller 804 takes the initiative of controlling the brake 894 and engages in controlling the brake 894. The controller 804 may control the brake 894 to maintain/reduce the speed of the subject vehicle 102 in accordance with the surrounding environment of the subject vehicle 102, apart from the extent of manipulation on the brake pedal.

According to embodiments of the present disclosure, a problem that may arise when a warning of a collision is generated only based on the expected time of collision may be solved by generating a warning using another distance-based condition, thereby increasing the probability of generating warnings to help safe driving.

It is to be understood that the above description is only illustrative of technical ideas, and various modifications, alterations, and substitutions are possible without departing from the essential characteristics of the present disclosure. Therefore, the embodiments and the accompanying drawings described above are intended to illustrate and not limit the technical idea, and the scope of technical thought is not limited by these embodiments and accompanying drawings. The scope of which is to be construed in accordance with the following claims, and all technical ideas which are within the scope of the same should be interpreted as being included in the scope of the right.

What is claimed is:

1. A method of generating a warning in a vehicle, the method comprising:
   obtaining a distance and a relative speed of the vehicle to a target vehicle ahead;
   obtaining a time required for a collision with the target vehicle from the distance and the relative speed; and
   generating a warning if at least one of a first condition, in which the time required for the collision is equal to or less than a predetermined warning generation time, and a second condition, in which the distance is equal to or less than a predetermined warning generation distance is satisfied.

2. The method according to claim 1, wherein generating a warning according to the second condition comprises generating the warning every time the target vehicle is within a predetermined ratio of a previous warning generation distance.

3. The method according to claim 2, wherein the warning is generated for a predetermined time every time the target vehicle is within the predetermined ratio of the previous warning generation distance.

4. The method according to claim 2, wherein the predetermined time is within two seconds.

5. The method according to claim 2, wherein the predetermined ratio is within 60%.

6. An apparatus for generating a warning in a vehicle, the apparatus comprising:
   a sensor for detecting a presence of a target vehicle ahead; and
   a controller for obtaining a distance and a relative speed of the vehicle to the target vehicle, obtaining a time required for a collision with the target vehicle from the distance and the relative speed, generating a warning if at least one of a first condition, in which the time required for the collision is equal to or less than a predetermined warning generation time, and a second condition, in which the distance is equal to or less than a predetermined warning generation distance is satisfied.

7. The apparatus according to claim 6, wherein the controller is configured to generate the warning every time the target vehicle is within a predetermined ratio of a previous warning generation distance when generating a warning according to the second condition.

8. The apparatus according to claim 7, wherein the controller is configured to generate the warning for a predetermined time every time the target vehicle is within the predetermined ratio of the previous warning generation distance.

9. The apparatus according to claim 7, wherein the predetermined time is within two seconds.

10. The method according to claim 7, wherein the predetermined ratio is within 60%.

11. A method of generating a warning in a vehicle, the method comprising:
    obtaining a distance to a target vehicle ahead; and
    generating a warning when the distance is equal to or less than a predetermined warning generation distance,
    wherein the warning is generated every time the target vehicle is within a predetermined ratio of a previous warning generation distance.

12. The method according to claim 11, wherein the warning is generated for a predetermined time every time the target vehicle is within the predetermined ratio of the previous warning generation distance.

13. A method of generating a warning in a vehicle, the method comprising:
    obtaining a distance and a relative speed of the vehicle to a target vehicle ahead;
    obtaining a time required for a collision with the target vehicle from the distance and the relative speed; and
    generating a warning if at least one of a first condition, in which the time required for the collision is equal to or less than a predetermined warning generation time, and a second condition, in which the distance is equal to or less than a predetermined warning generation distance is satisfied,
    wherein the warning is generated every time the target vehicle is within a predetermined ratio of a previous warning generation distance.

14. The method according to claim 13, wherein the warning is generated for a predetermined time the target vehicle is within the predetermined ratio of the previous warning generation distance.

* * * * *